(12) United States Patent
Zhan (10) Patent No.: US 8,115,799 B2
(45) Date of Patent: Feb. 14, 2012

(54) METHOD AND APPARATUS FOR OBTAINING ACOUSTIC SOURCE LOCATION INFORMATION AND A MULTIMEDIA COMMUNICATION SYSTEM

(75) Inventor: Wuzhou Zhan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 411 days.

(21) Appl. No.: 12/357,201

(22) Filed: Jan. 21, 2009

(65) Prior Publication Data
US 2009/0128617 A1    May 21, 2009

Related U.S. Application Data

(63) Continuation of application No. PCT/CN2007/070207, filed on Jun. 29, 2007.

(30) Foreign Application Priority Data

Jul. 25, 2006  (CN) .......................... 2006 1 0061812

(51) Int. Cl.
    *H04N 7/14* (2006.01)
(52) U.S. Cl. ............... 348/14.08; 348/14.01; 348/14.12
(58) Field of Classification Search .... 348/14.01–14.16; 381/92
    See application file for complete search history.

(56) References Cited

U.S. PATENT DOCUMENTS

| | | | |
|---|---|---|---|
| 5,940,118 A | 8/1999 | Van Schyndel | |
| 5,959,667 A | 9/1999 | Maeng | |
| 6,593,956 B1 * | 7/2003 | Potts et al. | 348/14.09 |
| 6,788,337 B1 | 9/2004 | Fujii | |
| 7,864,210 B2 * | 1/2011 | Kennedy | 348/14.08 |
| 2003/0048353 A1 | 3/2003 | Kenoyer et al. | |
| 2005/0008169 A1 | 1/2005 | Muren et al. | |
| 2005/0147257 A1 | 7/2005 | Melchior et al. | |
| 2005/0147261 A1 | 7/2005 | Yeh | |
| 2006/0104458 A1 * | 5/2006 | Kenoyer et al. | 381/92 |
| 2006/0104633 A1 | 5/2006 | Kenoyer et al. | |

FOREIGN PATENT DOCUMENTS

| | | |
|---|---|---|
| EP | 1 551 205 A1 | 7/2005 |
| WO | WO 2004/100546 A1 | 11/2004 |

OTHER PUBLICATIONS

European Patent Office, Extended European Search Report in European Patent Application No. 07764136.3 (Jul. 6, 2010).
State Intellectual Property Office of the People's Republic of China, English Translation of Written Opinion of the International Searching Authority in International Patent Application No. PCT/CN2007/070207 (Sep. 20, 2007).
State Intellectual Property Office of the People's Republic of China, Examination Report in Chinese Patent Application No. 200610061812.2 (Feb. 15, 2008).
Communication pursuant to Article 94(3) EPC, Application No. 07 764 136.3-1522, dated Dec. 2, 2011, 5 pages.

* cited by examiner

*Primary Examiner* — Melur Ramakrishnaiah
(74) *Attorney, Agent, or Firm* — Slater & Matsil, L.L.P.

(57) ABSTRACT

A method and an apparatus for obtaining the acoustic source location information and a multimedia communication system are provided. In the method, the acoustic source location information corresponding to the original location of lens and the lens controlling information are obtained, and the current acoustic source location information is obtained according to the acoustic location information corresponding to the original location of lens and the controlling information of lens.

13 Claims, 3 Drawing Sheets

METHOD AND APPARATUS FOR OBTAINING ACOUSTIC SOURCE LOCATION INFORMATION AND A MULTIMEDIA COMMUNICATION SYSTEM

CROSS-REFERENCE TO RELATED APPLICATIONS

The application is the continuation of International Patent Application No. PCT/CN2007/070207, filed Jun. 29, 2007, which claims priority to Chinese Patent Application No. 200610061812.2, filed Jul. 25, 2006, both of which are hereby incorporated by reference in their entirety.

FIELD OF THE INVENTION

The invention relates to the field of multimedia communication technologies, and in particular, to a method and apparatus for obtaining location information of an acoustic source and a multimedia communication system.

BACKGROUND OF THE INVENTION

With the development of techniques and the increase of objective requirements, the screen area for video display, such as the projector or video wall employed in a multimedia communication conference system, is becoming larger and larger. As a result, the images of the participants of the conference can move within a larger region on the screen. However, the orientation information of the sound played in the existing multimedia communication system does not correspond to the displayed image(s). Here, the orientation information of the sound refers to the information about the direction, along which the sound is sent, that is sensed by a listener, i.e. the location information of the acoustic source. Accordingly, when the position of the image of a speaking participant changes on the screen, the direction of the sound of the speaking participant does not change according to the change of position of the image of the speaking participant. In this way, the position of the speaking participant in the picture does not match the direction of the sound. In other words, the sound of the speaking participant heard by the listener is not propagated from the position of the image of the speaking participant on the screen. This results in a lack of sense of reality in the multimedia (including audio and video) communication.

U.S. Patent Publication No. 2003/0048353 discloses a method for solving the above problem. In the solution, a bar is disposed atop a television. The bar includes multiple microphones, multiple speakers and a video camera therein. An audio signal and the orientation information of a speaking participant with respect to the bar, i.e. the location information of the acoustic source, may be obtained after the sound signals collected by the microphones are processed. The transmitting end of the video communication system transmits the obtained audio signal and the location information of the acoustic source to the receiving end via network(s). The receiving end selects one or more speakers according to the received location information of the acoustic source. In this way, the location information of the speaking participant may be reproduced at the receiving end.

In the above existing solution, the location information of the acoustic source collected by the transmitting end is about the location with respect to the bar. This may result in a problem as follows: when the lens in the video camera is initially positioned right ahead of the bar so that the speaking participant who is right ahead of the bar is in the center of the picture, the collected orientation information of the sound of the speaking participant is also from right ahead of the bar. When the lens in the video camera rotates by an angle from its initial position, the speaking participant right ahead of the bar deviates from the center of the picture, even out of the picture. At this time, however, the collected orientation information of the sound of the speaking participant is still from right ahead of the bar. This may result in the mismatch between the collected orientation information of the sound of the speaking participant and the position of the speaking participant in the picture, i.e. the collected location information of the acoustic source does not match the position of the acoustic source in the picture. This may deteriorate the presence sensation in the multimedia communication.

SUMMARY OF THE INVENTION

An embodiment of the invention provides a multimedia communication system, which enables the location information of an acoustic source to be played at the receiving end to match the position of the acoustic source in the picture to be displayed.

Another embodiment of the invention provides an apparatus for obtaining location information of an acoustic source, by which the obtained location information of the acoustic source matches the position of the acoustic source in the picture.

Another embodiment of the invention provides a method for obtaining location information of an acoustic source, by which the obtained location information of the acoustic source matches the position of the acoustic source in the picture.

The technical solutions according to the embodiments of the invention are described as follows.

An embodiment of the invention discloses a multimedia communication system. The transmitting end of the system includes at least: at least two sound picking up devices, an image capturing device, and a processor; the receiving end of the system includes at least: an image output device and a sound output device; the system may further include a correction module;

each of the sound picking up devices is adapted to collect a sound signal of an acoustic source and send the collected sound signal to the processor;

the processor is adapted to receive multiple sound signals sent from the at least two sound picking up devices, obtain location information of the acoustic source corresponding to an initial position of a lens in the image capturing device according to the multiple sound signals, and send the location information of the acoustic source corresponding to the initial position of the lens in the image capturing device and the sound signals of the acoustic source to the correction model;

the image capturing device is adapted to collect an image signal and send the collected image signal and information of variation of the lens in the image capturing device to the correction model;

the correction model is adapted to obtain current location information of the acoustic source according to the location information of the acoustic source corresponding to the initial position of the lens in the image capturing device and the information of variation of the lens in the image capturing device, determine an orientation of sound of the acoustic source according to the current location information of the acoustic source, send orientation-adjusted sound signals of acoustic source to the sound output device and send the image signal to the image output device;

the sound output device is adapted to play the sound signals;

the image output device is adapted to display the image signal.

An embodiment of the invention discloses an apparatus for obtaining location information of an acoustic source. The apparatus includes an acoustic source location information obtaining module, a lens variation information obtaining module and a computing module, the acoustic source location information obtaining module is adapted to obtain location information of the acoustic source corresponding to an initial position of a lens, and send the location information to the computing module;

the lens variation information obtaining module is adapted to obtain information of variation of the lens and send the information of variation to the computing module;

the computing module is adapted to obtain current location information of the acoustic source according to the location information of the acoustic source corresponding to the initial position of the lens and the information of variation of the lens.

An embodiment of the invention discloses a method for obtaining location information of an acoustic source. The method may include the following steps of:

obtaining location information of the acoustic source corresponding to an initial position of a lens;

obtaining information of variation of the lens; and obtaining current location information of the acoustic source according to the location information of the acoustic source corresponding to the initial position of the lens and the information of variation of the lens.

In the above technical solutions according to the embodiments of the invention, the location information of the acoustic source corresponding to the initial position of the lens and the information of variation of the lens are obtained, then the current location information of the acoustic source can be obtained according to the location information of the acoustic source corresponding to the initial position of the lens and the information of variation of the lens. In this way, the obtained location information of the acoustic source matches the position of the acoustic source in the image, which improves the presence sensation in the multimedia communication.

DETAILED DESCRIPTION OF THE EMBODIMENTS

Figure 1A:
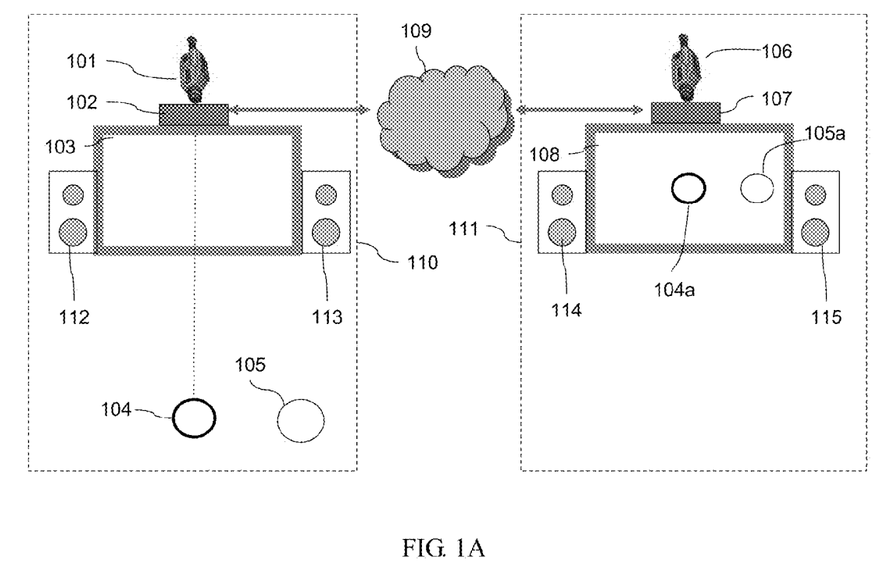
FIG. 1A is a diagram illustrating a scenario in a multimedia conference in which the lens in a video camera of the transmitting end is oriented right ahead.
Figure 1B:
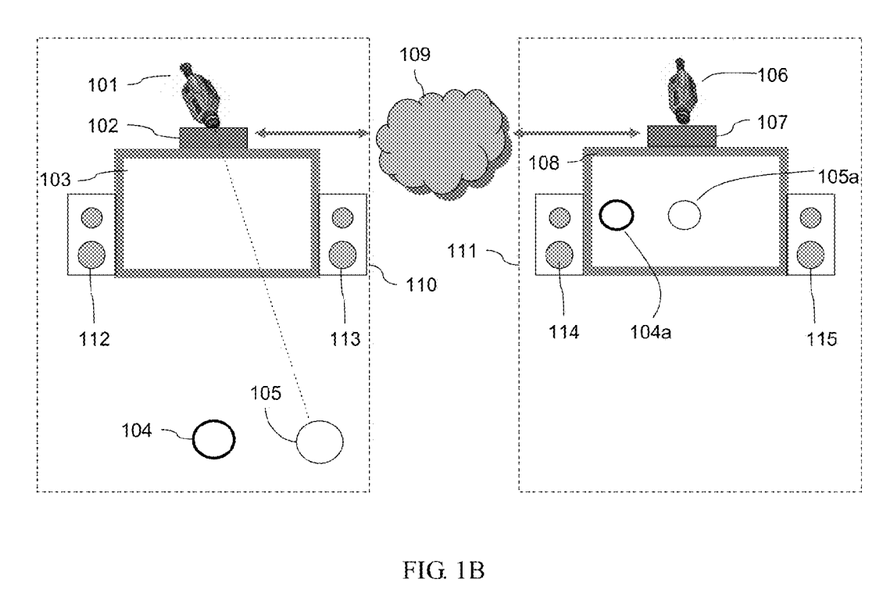
FIG. 1B is a diagram illustrating a scenario in the multimedia conference in which the lens in the video camera of the transmitting end has been rotated by an angle.

The typical scenarios in a multimedia conference, as shown in FIGS. 1A and 1B are described first to clarify the technical problem to be solved by the invention.

FIG. 1A is a diagram illustrating a scenario in a multimedia conference in which the lens in a video camera of the transmitting end is oriented right ahead. In FIG. 1A, 110 represents the conference place at the transmitting end; 111 represents the conference place at the receiving end; and 109 represents a communication network which may be an Internet Protocol (IP) network, a Public Switched Telephone Network (PSTN), a wireless network, etc. In the conference place 110 at the transmitting end, 101 represents a video camera, and the lens of the video camera is oriented right ahead; 102 represents a multimedia communication terminal; 103 represents a display screen; 104 and 105 represent participants of the conference, the participant 104 faces the lens of the video camera 101; and 112 and 113 represent speakers. A plurality of microphones, though not shown in FIG. 1A, are provided in the conference place 110. The microphones are connected to the multimedia communication terminal 102 via transmission lines. In the conference place 111 at the receiving end, 106 represents a video camera; 107 represents a multimedia communication terminal, 108 represents a display screen; 104a and 105a represent the images of the participants 104 and 105 of the conference, respectively; and 114 and 115 represent speakers. A plurality of microphones, though not shown in FIG. 1A, are provided in the conference place 111. The microphones in the conference place 111 are connected to the multimedia communication terminal 107 via transmission lines.

In FIG. 1A, after capturing an image, the video camera 101 in the conference place 110 at the transmitting end sends the image to the multimedia communication terminal 102. The multimedia communication terminal 102 processes (for example, encodes) the image and sends the processed image to the multimedia communication terminal 107 in the conference place 111 at the receiving end via the communication network 109. The multimedia communication terminal 107 decodes the code stream of the image and sends the decoded image to the display screen 108 for displaying. After capturing sound signals, the microphones in the conference place 110 at the transmitting end send the sound signals to the multimedia communication terminal 102. The multimedia communication terminal 102 encodes the sound signals and sends the encoded audio code stream to the multimedia communication terminal 107 in the conference place 111 at the receiving end via the communication network 109. The multimedia communication terminal 107 decodes the received audio code stream and sends the decoded audio code stream to the speakers 114 and 115 for playing.

FIG. 1B is a diagram illustrating a scenario in the multimedia conference in which the lens in the video camera of the transmitting end has been rotated by an angle. The multimedia conference communication system shown in FIG. 1B is the same one as shown in FIG. 1A. However, in FIG. 1B, the lens in the video camera 101 in the conference place 110 of the transmitting end has been rotated by an angle so that the participant 105 is facing the lens in the video camera 101.

In FIG. 1A, the lens in the video camera 101 faces the participant 104, therefore the image 104a of the participant 104 is shown at the center of the display screen 108. In FIG. 1B, the lens in the video camera 101 faces the participant 105, therefore the image 105a of the participant 105 is shown at the center of the display screen 108. At this time, the image 104a of the participant 104 appears in the left of the display screen 108, deviating from the centre of the display screen 108. Without loss of generality, it is assumed that a plurality of microphones built in the multimedia communication terminal 102 are used to collect sound signals to compute the orientation of the speaking participant, and it is assumed that the participant 104 is speaking currently. In the two scenarios as shown in FIG. 1A and FIG. 1B, the speaking participant 104 is right ahead of the multimedia communication terminal 102, therefore, the computed orientation of the sound is "right ahead". As shown in FIG. 1B, however, the image 104a of the speaking participant 104 has been deviated so that the image 104a is in the left part of the display screen 108. In other words, the orientation of the sound of the speaking participant being played in the conference place 111 at the receiving end does not match the position of the image of the speaking participant in the display screen. Therefore, the orientation information of the sound is required to be adjusted according to the rotated angle of the lens in the video camera.

Some particular embodiments of the invention which solve the above technical problems are provided below.

Figure 2:
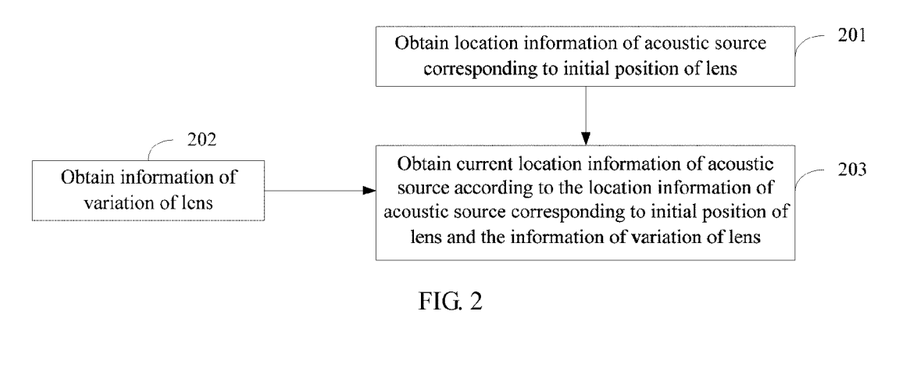
FIG. 2 is a flow chart illustrating a method for obtaining location information of an acoustic source according to an embodiment of the invention.

FIG. 2 is a flow chart illustrating a method for obtaining location information of an acoustic source according to an embodiment of the invention. As shown in FIG. 2, the method may include the following steps.

Step 201: Location information of the acoustic source corresponding to an initial position of a lens is obtained.

In the step 201, multiple sound signals may be collected by using multiple microphones. The collected multiple sound signals are processed to compute the location information of the acoustic source. In particular, the location information of the acoustic source may include: a horizontal angle of the acoustic source, a vertical angle of the acoustic source, and a distance from the acoustic source, etc. The horizontal angle of the acoustic source is the horizontal angle of the acoustic with respect to the central axis of the lens, the vertical angle of the acoustic source is the vertical angle of the acoustic with respect to the central axis of the lens, and the distance from the acoustic source is the distance between the acoustic source and the lens. The techniques of collecting multiple sound signals and computing the location information of the acoustic source can be found in the existing publications and are not described in the embodiments of the invention.

In the step 201, the location information of the acoustic source corresponding to the initial position of the lens is the location information of the acoustic source collected by the microphones, wherein the direction right ahead of the microphones when the microphones are collecting the location information of the acoustic source is the same direction as that right ahead of the lens when the lens is located at its initial position, as shown in the conference place of the transmitting end in FIG. 1A.

Step 202: The information of variation of the lens is obtained.

In the step 202, the information of variation of the lens includes the information about the variation in the position of the lens with respect to its initial position, including a horizontally rotated angle of the lens, a vertically rotated angle of the lens, and a focal length of the lens, etc.

Step 203: Current location information of the acoustic source is obtained according to the location information of the acoustic source corresponding to the initial position of the lens and the information of variation of the lens.

For example, $\omega_s$, $\theta_s$, and $D_s$ represent the horizontal angle, the vertical angle and the distance computed in step 201, respectively; $\omega_c$, $\theta_c$, and f represent the horizontal angle, the vertical angle and the focal length of the lens obtained in step 202, respectively; and $\omega$, $\theta$, and D represent the current horizontal angle, the vertical angle and the distance obtained in step 203, respectively. $\omega$, $\theta$, and D may be computed according to following equations:

$$\omega = \omega_s - \omega_c \quad (1)$$

$$\theta = \theta_s - \theta_c \quad (2)$$

$$D = (f_0/f) \times D_s \quad (3)$$

In the equation (3), $f_0$ is the default focal length of the lens, or may be a set value.

After the current location information of the acoustic source is obtained by the steps as shown in FIG. 2, the orientation of the sound of the acoustic source being played at the receiving end may be determined according to the current location information of the acoustic source. Then the sound signals of the acoustic source may be played at the receiving end according to the determined orientation. In this way, the orientation of the sound signals of the acoustic source being played matches the position of the acoustic source in the picture being displayed.

In general, the steps 201-203 as shown in FIG. 2 all are performed at the transmitting end as shown in FIG. 1. The multiple microphones collect the multiple sound signals of the acoustic source and send the sound signals the multimedia communication terminal 102. The video camera 101 outputs the information of variation of the lens to the multimedia communication terminal 102. The multimedia communication terminal 102 computes the location information of the acoustic source corresponding to the initial position of the lens according to the multiple sound signals, computes the current location information of the acoustic source according to the location information of the acoustic source corresponding to the initial position of the lens and the information of variation of the lens, and sends the current location information of the acoustic source to the multimedia communication terminal 107 at the receiving end via communication network 109. The multimedia communication terminal 107 adjusts the orientation of the received sound of the acoustic according to current location information of the acoustic source, and the adjusted sound of the acoustic source is played by the speakers. As an alternative, the step 203 may also be performed at the receiving end. In this case, the multimedia communication terminal 102 at the transmitting end sends the location information of the acoustic source corresponding to the initial position of the lens and the information of variation of the lens to the multimedia communication terminal 107 at the receiving end via communication network 109. The multimedia communication terminal 107 executes the operations in step 203.

In an embodiment of the invention, when determining the orientation of the sound of the acoustic source being played at the receiving end according to the current location information of the acoustic source, the location information of the acoustic source may be converted into information of relative position of the acoustic source in the picture, and the orientation of the sound of the acoustic source being played at the receiving end is determined according to the information of relative position of the acoustic source in the picture and the current distance information of the acoustic source, so as to enable the orientation of sound of the acoustic source to match the position of the acoustic source in the picture displayed at the receiving end without being affected by the size of the display screen at the receiving end. The process of converting the current location information of the acoustic source into the information of relative position of the acoustic source in the picture according to an embodiment of the invention is described below.

Figure 3:
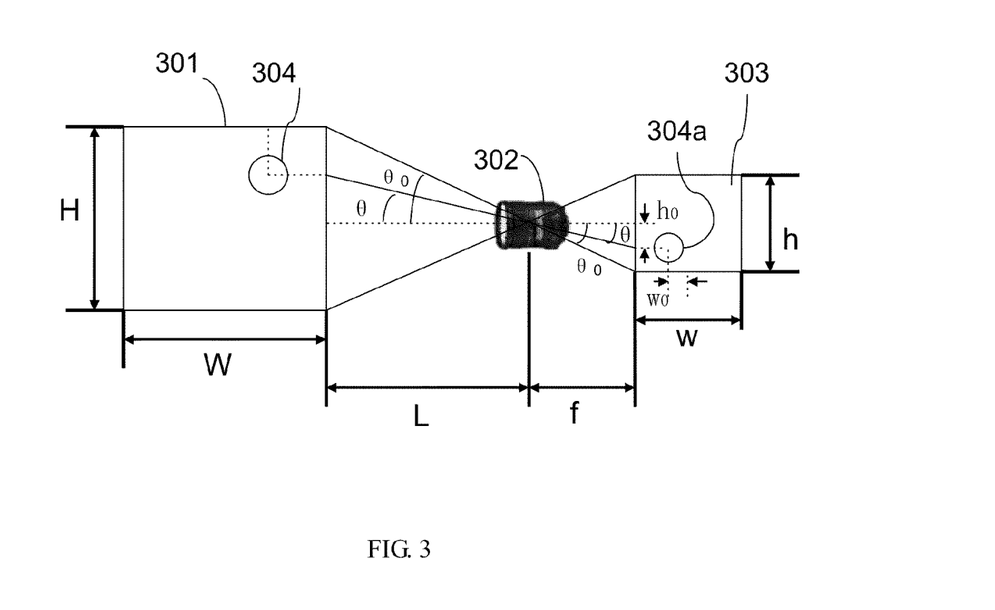
FIG. 3 is a diagram illustrating the imaging of the lens in the video camera in the scenario of the multimedia conference as shown in FIG. 1A.

FIG. 3 is a diagram illustrating the imaging of the lens in the video camera in the scenario of the multimedia conference as shown in FIG. 1A. In FIG. 3, 301 represent the conference place, 302 represents the lens, 303 represents the imaging of a conference scenario formed on the target face of the lens, 304 represents a speaking participant in the conference place, 304a represents the image of the speaking participant 304, W represents the width of the conference scenario, H represents the height of the conference scenario, w represents the width of the imaging, h represents the height of the imaging, L represents the distance between the lens and the conference scenario, f represents the focal length of the lens, $w_0$ and $h_0$ represent the width and height of the image 304a of the speaking participant from the center of the target face, respectively. In addition, in FIG. 3, $\theta$ represents the angle in vertical direction of the speaking participant deviating from the lens, i.e. the current vertical angle of the acoustic source as illustrated in Equation (2); $\theta_0$ represents the angle in vertical direction of the edge of the conference scenario deviating from the lens, i.e. the maximum viewing angle from which the image can be captured. The angle in horizontal direction of the speaking participant deviating from the lens, i.e. the current horizontal angle of the acoustic source as illustrated in Equation (1), is represented by $\omega$, but is not shown in this Figure. In addition, the angle in horizontal direction of the edge of the conference scenario deviating from the lens is represented by $\omega_0$.

How to compute the relative position of the acoustic source in the picture according to FIG. 3 is described below. The relative position of the acoustic source in the picture may be represented by a relative position. It is supposed that the relative positions of the acoustic source in horizontal and vertical directions in the picture are represented by w' and h', respectively, and may be computed by the following equations:

$$w'=w_0/(w/2) \quad (4)$$

$$h'=h_0/(h/2) \quad (5)$$

In addition, as can be deduced from FIG. 3:

$$h_0/(h/2)=(h_0/f)/((h/2)/f)=tag\theta/tag\theta_0$$

Likewise, $$w_0/(w/2)=(w_0/f)/((w/2)/f)=tag\omega/tag\omega_0$$

Therefore, the equations (4) and (5) are equivalent to:

$$w'=tag\omega/tag\omega_0 \quad (6)$$

$$h'=tag\theta/tag\theta_0 \quad (7)$$

$tag\omega_0$ and $tag\theta_0$ in the equations (6) and (7) may be computed by the following equations:

$$tag\omega_0=(w/2)/f \quad (8)$$

$$tag\theta_0=(h/2)/f \quad (9)$$

By the above computation, when the speakers at the receiving end are to play the sound of the acoustic source including the location information, the orientation of the sound of the acoustic source to be played at the receiving end may be determined first, according to the relative positions w' and h' of the acoustic source in the picture and the current distance D of the acoustic source, then the sound of the acoustic source is played at the receiving end according to the determined orientation.

The above described process of converting the current location information of the acoustic source into the information of relative position of the acoustic source in the picture may be performed at the receiving end, or at the transmitting end.

The process of determining the orientation of the sound of the acoustic source to be played at the receiving end according to w' and h' and the current distance D of the acoustic source and playing the sound of the acoustic source at the receiving end according to the determined orientation may be implemented by various approaches. For example, in the first approach where each of the left and right sides of the display screen is provided with a speaker, the magnitudes of the sound signals in the left and right channels are adjusted so that the sound of the acoustic source matches the picture in the horizontal direction. The difference in vertical direction between the orientation of the sound of the acoustic source and the position of the acoustic source in the picture may be neglected, since a listener is not sensitive to it. In addition, the distance of the acoustic source may be adjusted by adjusting the overall magnitude of the sound, a particular method for the adjusting is described by the following two equations:

$$w'=(g1-g2)/(g1+g2) \quad (10)$$

$$c=g1 \times g1+g2 \times g2 \quad (11)$$

In the equations (10) and (11), g1 represents the magnitude gain in the left channel, g2 represents the magnitude gain in the right channel, w' represents the relative position in horizontal direction of the acoustic source in the picture computed according to the equation (6). If the distance of the acoustic source is not adjusted, c may be a fixed value, for example equal to "1". If the distance of the acoustic source is to be adjusted, c is inversely proportional to the current distance of the acoustic source, which may be represented by the following equation:

$$c=C0/D \quad (12)$$

In the equation (12), C0 is a set fixed value, D is the current distance of the acoustic source computed by the equation (3).

The second approach is a method for processing sound according to the location information of the acoustic source. In the method, an acoustic source is virtualized by using Head Related Transfer Functions (HRTF). The techniques of virtualizing an acoustic source by using HRTF have been disclosed in existing publications, and are not described in the invention.

The above technical solutions of converting the location information of sound into the relative position of the acoustic source in the picture enable the orientation of the sound being played at the receiving end to be not affected by the size of the display screen.

Figure 4:
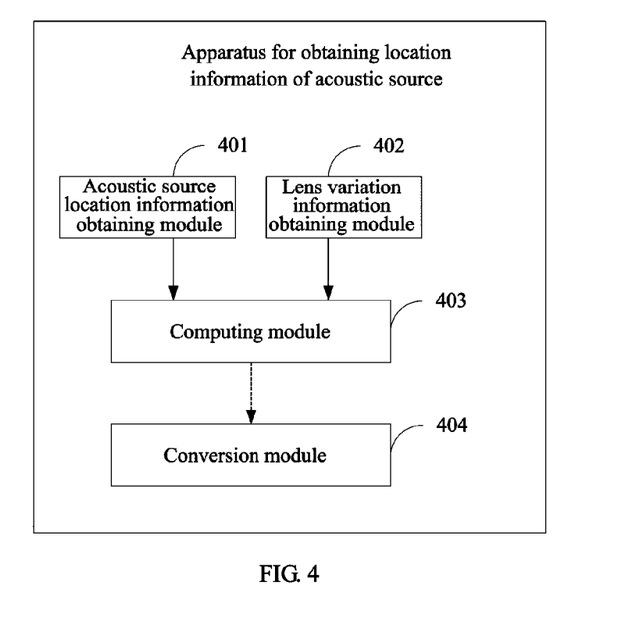
FIG. 4 is a block diagram illustrating the structure of an apparatus for obtaining location information of an acoustic source according to an embodiment of the invention.

FIG. 4 is a block diagram illustrating the structure of an apparatus for obtaining location information of an acoustic source according to an embodiment of the invention. As shown in FIG. 4, the apparatus includes an acoustic source location information obtaining module 401, a lens variation information obtaining module 402 and a computing module 403.

The acoustic source location information obtaining module 401 is adapted to obtain location information of the acoustic source corresponding to an initial position of a lens, and send the location information to the computing module 403.

The lens variation information obtaining module 402 is adapted to obtain information of variation of the lens and send the information of variation to the computing module 403.

The computing module 403 is adapted to receive the location information of the acoustic source corresponding to the initial position of the lens sent from the acoustic source location information obtaining module 401 and the information of variation of the lens sent from the lens variation information obtaining module 402, and obtain current location information of the acoustic source according to the location information of the acoustic source corresponding to the initial position of the lens and the information of variation of the lens.

The orientation of the sound signals from the acoustic source may be adjusted by using the current location information of the acoustic source obtained by the computing module 403, and the sound signals adjusted in orientation may be played at the receiving end. In this way, the orientation of the sound being played is enabled to match the position of the acoustic source in the image.

In the embodiment as shown in FIG. 4, the location information of the acoustic source and the information of variation of the lens may be the same as those described in the embodiment as shown in FIG. 2, and are not repeated herein.

In the embodiment as shown in FIG. 4, the apparatus for obtaining location information of the acoustic source may further include a conversion module 404, as shown by the dotted line block in FIG. 4. The conversion module 404 is adapted to receive the current location information of the acoustic source sent from the computing module 403, convert a current horizontal angle of the acoustic source and a current vertical angle of the acoustic source into information of a relative horizontal position and information of a relative vertical position of the acoustic source in the picture to be displayed, and determine orientation of sound of the acoustic source to be played at the receiving end according to the information of relative positions of the acoustic source in the picture to be displayed and a current distance of the acoustic source.

The method used by the conversion module 404 in converting the current horizontal angle of the acoustic source and the current vertical angle of the acoustic source into the information of the relative positions of the acoustic source in the picture to be displayed is the same as that shown by the equations (6) and (7), and is not repeated herein.

Figure 5:
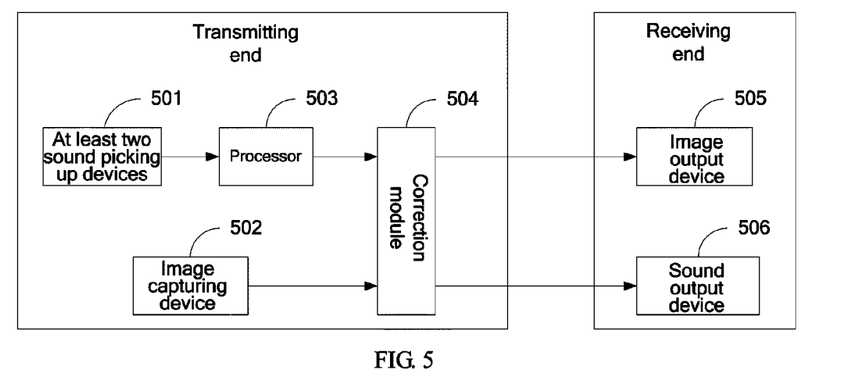
FIG. 5 is a block diagram illustrating the structure of a multimedia communication system according to an embodiment of the invention.

The embodiment of the invention as shown in FIG. 5 is based on the technical solutions according to the above embodiments.

FIG. 5 is a block diagram illustrating the structure of a multimedia communication system according to an embodiment of the invention. As shown in FIG. 5, the transmitting end of the system includes: at least two sound picking up devices 501, an image capturing device 502, and a processor 503. The receiving end of the system includes at least: an image output device 505 and a sound output device 506. The system may further include a correction module 504. The correction module 504 may be located in the transmitting end or the receiving end, or may be separated from both the transmitting end and the receiving end. In this embodiment, the correction module 504 is located at the transmitting end.

In FIG. 5, the at least two sound picking up devices 501 are adapted to collect multiple sound signals of an acoustic source and send the collected sound signals to the processor 503.

The processor 503 is adapted to receive the multiple sound signals sent from the at least two sound picking up devices 501, obtain location information of the acoustic source corresponding to an initial position of a lens in the image capturing device 502 according to the multiple sound signals, and send the location information of the acoustic source corresponding to the initial position of the lens in the image capturing device 502 and the sound signals of the acoustic source to the correction model 504.

The image capturing device 502 is adapted to collect an image signal and send the collected image signal and information of variation of the lens in the image capturing device to the correction model 504.

The correction model 504 is adapted to receive the sound signals of the acoustic source and the location information of the acoustic source corresponding to the initial position of the lens in the image capturing device sent from the processor 503 and the image signal and the information of variation of the lens in the image capturing device sent from the image capturing device 502, obtain current location information of the acoustic information according to the location information of the acoustic source corresponding to the initial position of the lens in the image capturing device and the information of variation of the lens in the image capturing device, determine an orientation of sound of the acoustic source according to the current location information of the acoustic source, send sound signals adjusted in orientation to the sound output device 506 and send the image signal to the image output device 505.

The sound output device 506 is adapted to receive the sound signals sent from the correction module 504, and play the sound signals.

The image output device 505 is adapted to receive the image signal sent from the correction module 504, and display the image signal.

In the embodiment as shown in FIG. 5, the sound picking up device 501 may be a microphone, the image capturing device may be a video camera or a video pickup head, etc. The image output device 505 may be a television or a projector, etc. The sound output device 506 may a speaker or the like. The location information of the acoustic source and the information of variation of the lens may be the same as those described in the embodiment as shown in FIG. 2, and are not repeated herein.

In the embodiment as shown in FIG. 5, the correction module 504 is further adapted to convert the current horizontal angle of the acoustic source and the current vertical angle of the acoustic source into the information of the relative positions of the acoustic source in the picture to be displayed and determine the orientation of the sound of the acoustic source according to the relative positions of the acoustic source in the picture to be displayed and the current distance of the acoustic source according to the equations (6) and (7), which is not repeated herein.

In the embodiment as shown in FIG. 5, the orientation of the sound of the acoustic source played by the sound output device 506 matches the position of the acoustic source in the picture displayed by the image output device 505, thereby the presence sensation in the multimedia communication is improved.

In summary, in the embodiments of the invention, the location information of the acoustic source corresponding to the initial position of the lens and the information of variation of the lens are obtained, and the current location information of the acoustic source can be obtained according to the location information of the acoustic source corresponding to the initial position of the lens and the information of variation of the lens. In this way, the obtained location information of the acoustic source matches the position of the acoustic source in the image captured by the lens. This improves the presence sensation in the multimedia communication.

The embodiments described above are only exemplary preferred embodiments of the invention, and should not be construed as a limitation to the protection scope of the invention. Various modifications, equivalent substitution and variations made to the invention within the spirit and principle of the invention shall fall within the protection scope of the invention.

What is claimed is:

1. A multimedia communication system, comprising:
a transmitting end of the system comprising at least two sound picking up devices, an image capturing device, and a processor;

a receiving end of the system comprises at least an image output device and a sound output device; and
a correction module,
wherein each of the at least two sound picking up devices is adapted to collect a sound signal of an acoustic source and send the collected sound signal to the processor;
wherein the processor is adapted to receive multiple sound signals sent from the at least two sound picking up devices, to obtain location information of the acoustic source corresponding to an initial position of a lens in the image capturing device according to the sound signals, and to send the location information to the correction model;
wherein the image capturing device is adapted to collect an image signal, to obtain information of variation of the lens, and to send the collected image signal and information of variation of the lens with respect to the initial position of the lens to the correction module;
wherein the correction module is adapted to obtain current location information of the acoustic information according to the location information of the acoustic source and the information of variation of the lens, and to determine an orientation of sound of the acoustic source according to the current location information of the acoustic source; and
wherein the receiving end is adapted to play the orientation of the sound of the acoustic source according to the determined orientation, so that the orientation of the sound signals of the acoustic source being played at the receiving end matches the position of the acoustic source in a picture being displayed.

2. The system according to claim 1, wherein
the location information of the acoustic source, comprises at least one of a horizontal angle of the acoustic source, a vertical angle of the acoustic source, and a distance of the acoustic source corresponding to the initial position of the lens;
the information of variation of the lens comprises at least one of a horizontally rotated angle of the lens, a vertically rotated angle of the lens, and a focal length of the lens, to the correction module;
the correction module is adapted to obtain at least one of a current horizontal angle of the acoustic source by subtracting the horizontally rotated angle of the lens from the horizontal angle of the acoustic source corresponding to the initial position of the lens, a current vertical angle of the acoustic source by subtracting the vertically rotated angle of the lens from the vertical angle of the acoustic source corresponding to the initial position of the lens, and obtain a current distance of the acoustic source by multiplying the distance of the acoustic source corresponding to the initial position of the lens by a preset correction coefficient.

3. The system according to claim 2, wherein the correction module is further adapted to:
obtain information of at least one of a horizontally relative position of the acoustic source in a picture to be displayed by using the current horizontal angle of the acoustic source, and a vertically relative position of the acoustic source in the picture to be displayed by using the current vertical angle of the acoustic source; and
determine the orientation of sound of the acoustic source according to the information of at least one of the horizontally relative position of the acoustic source in the picture to be displayed, the vertically relative position of the acoustic source in the picture to be displayed, and the current distance of the acoustic source.

4. An apparatus for obtaining location information of an acoustic source, comprising:
an acoustic source location information obtaining module,
a lens variation information obtaining module; and
a computing module,
wherein the acoustic source location information obtaining module is adapted to obtain location information of the acoustic source corresponding to an initial position of a lens, and to send the location information to the computing module;
wherein the lens variation information obtaining module is adapted to obtain information of variation of the lens and send the information of variation to the computing module;
wherein the computing module is adapted to obtain current location information of the acoustic source according to the location information of the acoustic source corresponding to the initial position of the lens and the information of variation of the lens;
wherein the location information of the acoustic source comprises at least one of a horizontal angle of the acoustic source, a vertical angle of the acoustic source, and a distance of the acoustic source corresponding to the initial position of the lens,
wherein the information of variation of the lens comprises at least one of a horizontally rotated angle of the lens, a vertically rotated angle of the lens, and a focal length of the lens, and
wherein the computing module is adapted to obtain at least one of a current horizontal angle of the acoustic source by subtracting the horizontally rotated angle of the lens from the horizontal angle of the acoustic source corresponding to the initial position of the lens, a current vertical angle of the acoustic source by subtracting the vertically rotated angle of the lens from the vertical angle of the acoustic source corresponding to the initial position of the lens, and a current distance of the acoustic source by multiplying the distance of the acoustic source corresponding to the initial position of the lens by a preset correction coefficient.

5. The apparatus according to claim 4, further comprising a conversion module, adapted to
receive at least one of the current horizontal angle of the acoustic source, the current vertical angle of the acoustic source, and the current distance of the acoustic source sent from the computing module;
obtain information of at least one of a horizontally relative position of the acoustic source in a picture to be displayed by using the current horizontal angle of the acoustic source, and a vertically relative position of the acoustic source in the picture to be displayed by using the current vertical angle of the acoustic source; and
determine the orientation of sound of the acoustic source to be played at a receiving end according to the information of at least one of the horizontally relative position of the acoustic source in a picture to be displayed, the vertically relative position of the acoustic source in the picture to be displayed, and the current distance of the acoustic source.

6. A method for obtaining current location information of an acoustic source, comprising:
obtaining location information of the acoustic source corresponding to an initial position of a lens;
obtaining information of variation of the lens; and
obtaining current location information of the acoustic source according to the location information of the acoustic source corresponding to the initial position of the lens and the information of variation of the lens;

wherein the location information of the acoustic source comprises at least one of a horizontal angle of the acoustic source, a vertical angle of the acoustic source, and a distance of the acoustic source;

the information of variation of the lens comprises at least one of a horizontally rotated angle of the lens, a vertically rotated angle of the lens, and a focal length of the lens;

obtaining the current location information of the acoustic source comprises: obtaining at least one of a current horizontal angle of the acoustic source by subtracting the horizontally rotated angle of the lens from the horizontal angle of the acoustic source corresponding to the initial position of the lens, a current vertical angle of the acoustic source by subtracting the vertically rotated angle of the lens from the vertical angle of the acoustic source corresponding to the initial position of the lens, and a current distance of the acoustic source by multiplying the distance of the acoustic source corresponding to the initial position of the lens by a preset correction coefficient.

7. The method according to claim 6, further comprising:
obtaining information of at least one of a horizontally relative position of the acoustic source in a picture to be displayed by using the current horizontal angle of the acoustic source, and a vertically relative position of the acoustic source in the picture to be displayed by using the current vertical angle of the acoustic source, and
determining the orientation of sound of the acoustic source to be played at a receiving end according to the information of at least one of the horizontally relative position of the acoustic source in the picture to be displayed, the vertically relative position of the acoustic source in the picture to be displayed, and the current distance of the acoustic source.

8. The method according to claim 7, wherein
obtaining the information of the horizontally relative position of the acoustic source in a picture to be displayed comprises: dividing a tangent value of the current horizontal angle of the acoustic angle by a tangent value of an angle of an edge of a conference scenario deviating from the lens in horizontal direction, to obtain the information of horizontally relative position of the acoustic source in a picture to be displayed;
obtaining the information of the vertically relative position of the acoustic source in a picture to be displayed comprises: dividing a tangent value of the current vertical angle of the acoustic angle by a tangent value of an angle of an edge of a conference scenario deviating from the lens in vertical direction, to obtain the information of vertically relative position of the acoustic source in a picture to be displayed.

9. The method according to claim 6, wherein
obtaining the location information of the acoustic source corresponding to the initial position of the lens and obtaining the information of variation of the lens are performed at a transmitting end;
obtaining the current location information of the acoustic source is performed at one of a receiving end and the transmitting end.

10. An apparatus for obtaining current location information of an acoustic source, the apparatus comprising a processor configured to implement a method comprising:

obtaining location information of the acoustic source corresponding to an initial position of a lens;
obtaining information of variation of the lens with respect the initial position of the lens;
obtaining current location information of the acoustic source according to the location information and the information of variation of the lens;
wherein the location information of the acoustic source comprises at least one of a horizontal angle of the acoustic, a vertical angle of the acoustic and a distance from the acoustic source;
wherein the information of variation of the lens comprises at least one of a horizontally rotated angle of the lens, a vertically rotated angle of the lens, and a focal length of the lens;
wherein the current location information of the acoustic source comprises at least one of a current horizontal angle , a current vertical angle and a current distance;
wherein the current horizontal angle is obtained by computing a difference between the horizontal angle of the acoustic and the horizontally rotated angle of the lens, and the current vertical angle is obtained by computing a difference between the vertical angle of the acoustic and the vertically rotated angle of the lens, the current distance is obtained by multiplying the distance from the acoustic source by a preset correction coefficient.

11. A method of presenting video conference information, the method comprising:
receiving a video image from a remote end of a video conference;
receiving audio from the remote end of the video conference, the audio corresponding to the video;
receiving information relating to a location of a speaking participant;
displaying the video image; and
playing the audio over a plurality of speakers such that a volume of each speaker is set based upon the information relating to the location of the speaking participant, wherein the information relating to the location of the speaking participant comprises a current horizontal angle computed by subtracting a horizontally rotated angle of a lens that generates the video image from a horizontal angle corresponding to an initial position of the lens.

12. The method according to claim 11, wherein audio played at a speaker located to the left of the displayed video image is louder than audio played at a speaker located to the right of the displayed video image when the speaking participant is located in a left half of the video image and wherein the audio played at the speaker located to the right of the displayed video image is louder than the audio played at the speaker located to the left of the displayed video image when the speaking participant is located in a right half of the video image.

13. The method according to claim 11, wherein:
displaying the video comprises displaying the video at a image output device;
the plurality of speakers comprises a left speaker located left of the image output device and a right speaker located right of the image output device; and
the volumes of the left speaker and the right speaker are adjusted so that the audio is related to the video in the horizontal direction.

* * * * *